No. 778,529. Patented December 27, 1904.

UNITED STATES PATENT OFFICE.

FREDERICK H. BRUENING, OF PITTSBURG, PENNSYLVANIA.

INSULATING MATERIAL AND PROCESS OF PRODUCING SAME.

SPECIFICATION forming part of Letters Patent No. 778,529, dated December 27, 1904.

Application filed November 1, 1904. Serial No. 231,028.

*To all whom it may concern:*

Be it known that I, FREDERICK H. BRUENING, a citizen of the United States, residing at Pittsburg, in the county of Allegheny and State of Pennsylvania, have discovered or invented a new and useful Improvement in Insulating Materials and Processes of Producing the Same, of which improvement the following is a specification.

My invention relates to insulating materials and process for producing the same.

The object of my invention is to produce a material which is a non-conductor of heat, cold, and sound, is waterproof, and non-expansible and non-contractible when subjected to the action of heat, cold, and water. The material so produced is capable of use in all classes of construction where insulation from the elements specified is desirable or necessary—as, for instance, in refrigerators and like constructions used in breweries, in the walls of buildings where even temperatures are necessary or desirable to be maintained, between the floors of buildings where it is desirable to deaden concussion or lessen sound, or, in fact, any construction in which insulation is necessary or desirable.

The material produced comprises cork, treated as hereinafter described, incorporated in cement or coalescing compound consisting of tar or pitch, comminuted or ground flint or silica, ground clay, comminuted or ground feldspar, oil of rosin, and litharge mixed in the proportions and treated as hereinafter specified. In the production of said material the cork—*i. e.*, the granules or waste cork of any form—is first reduced to any desirable-sized particles, dependent on the density or closeness of texture of the material required. The cork is then subjected to a drying process by heat in any suitable vessel sufficient to drive off all the volatile matter that may be contained therein. I find that by subjecting the cork to heat ranging from 300° to 400° Fahrenheit during approximately fifteen minutes not only drives off such volatile matter, but also greatly reduces the elasticity or resiliency of the cork and reduces it to a condition or quality highly desirable in the production of this insulating material. The cement or coalescing compound in which the cork is incorporated comprises or consists of tar or pitch thirty-eight parts, the tar or pitch being previously prepared by subjecting the same to heat from 400° to 500° Fahrenheit or to a sufficient heat to clarify the same by boiling. I have found by practice that heat ranging from 400° to 500° Fahrenheit produces satisfactory results. Sixteen parts of comminuted or ground flint are subjected to heat ranging from 500° to 600° Fahrenheit, eight parts of ground clay are subjected to heat ranging from 400° to 500° Fahrenheit, eight parts of feldspar comminuted or ground and subjected to approximately 500° Fahrenheit, two parts oil of rosin mixed with two parts litharge, acetate of lead or zinc, the said oil of rosin and litharge being mixed and subjected to heat ranging from 500° to 600° Fahrenheit. The litharge or acetate of lead or zinc is placed in a bag and submerged in the oil of rosin during the boiling process. The purpose of subjecting the flint, clay, and feldspar to the degrees of heat above specified is to drive off whatever moisture may be contained therein. The compound above specified is thoroughly mixed and subjected to a heat sufficient to bring the same to a syrup-like consistency, and when in this condition twenty-six parts of prepared cork are mixed or incorporated therein, and when thoroughly incorporated the compound is poured or charged into molds of suitable size and configuration, dependent upon the articles or form of material required, and when the same is cool and sufficiently compressed the material is ready for use. The litharge or acetate of lead or zinc subserves the function of a drier, the flint, clay, feldspar, and cork furnish the body or base, the flint and feldspar, in conjunction with the softer material, (clay,) subserving the additional function of a binding material. The pitch or tar and oil of rosin when subjected to the heat specified give to the entire mass fluidity sufficient to enable the same to be poured into molds.

I claim as my invention or discovery and desire to secure by Letters Patent—

1. The herein-described process for producing insulating material which consists in subjecting cork or cork-wood to sufficient heat to drive off the volatile matter contained therein then incorporating the same in a cement or coalescing material comprising pitch or tar boiled or subjected to heat, flint, comminuted or ground, ground clay, ground feldspar, oil of rosin and litharge thoroughly mixed in the presence of heat sufficient to reduce the same and the pitch to a fluid condition, and finally pouring the compound into molds.

2. An insulating material comprising twenty-six parts of cork first subjected or dried in the presence of heat as herein specified, thirty-eight parts of pitch or tar, subjected to heat as herein specified, sixteen parts of ground flint, subjected to heat as herein specified, eight parts of clay, subjected to heat as herein specified, eight parts of feldspar, subjected to heat as herein specified and two parts each of oil of rosin and litharge, mixed and subjected to heat as herein specified, the said materials being thoroughly mixed and incorporated as herein specified.

In testimony whereof I have hereunto signed my name in the presence of two subscribing witnesses.

FREDERICK H. BRUENING.

In presence of—
 CLARENCE A. WILLIAMS,
 JOHN H. RONEY.